UNITED STATES PATENT OFFICE 2,319,976

DEHYDROABIETINAL AND METHOD OF PRODUCING

William P. Campbell, Newark, Del., assignor to Hercules Powder Company, Wilmington, Del., a corporation of Delaware No Drawing. Application August 11, 1942, Serial No. 454,457

6 Claims. (Cl. 260—97)

This invention relates to a new composition of matter and to a method for its production. More particularly, it relates to dehydroabietinal as a new composition of matter and to a method of production thereof.

Several derivatives of dehydroabietic acid have been described in the art. However, the aldehyde containing the hydrocarbon nucleus of dehydroabietic acid but having the carboxyl group replaced by the aldehyde group has not been prepared or described previously.

Now, in accordance with this invention, it has been discovered that dehydroabietinal, the aldehyde corresponding to dehydroabietic acid with substitution of the carboxyl group by the aldehyde group, may be prepared. Its method of preparation, in accordance with this invention, involves reduction of the acid halide such as the acid chloride or acid bromide formed from dehydroabietic acid.

Dehydroabietinal is believed to have the following structural formula:

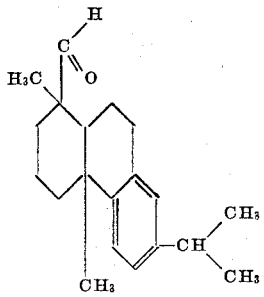

The following example illustrates the method of producing dehydroabietinal described in accordance with this invention:

Example

Thirty two parts by weight of the acid chloride formed from dehydroabietic acid were dissolved in 440 parts by weight of dry xylene. To this solution 20 parts by weight of 10% palladium on barium sulfate catalyst were added and the vessel containing the mixture flushed out with nitrogen. The solution was then heated to the boiling point and a stream of dry hydrogen passed through the vessel. The hydrogen was dried by passage through sulfuric acid prior to entry into the reaction vessel. The solution was stirred vigorously while passing in the hydrogen. The excess hydrogen as well as the hydrogen chloride formed during the reaction were passed into water and the hydrogen chloride titrated with normal sodium hydroxide solution so as to follow the progress of the reaction. After 24 minutes the reaction had gone 80% to completion as determined by the hydrogen chloride evolved. The solution was then cooled and the reaction vessel flushed out with nitrogen. The reaction solution was then filtered to separate the catalyst and the filtrate steam-distilled, leaving the dehydroabietinal behind as a viscous liquid. The dehydroabietinal was converted to its semicarbazone by dissolving in methyl alcohol and adding sufficient semicarbazide hydrochloride and 12 parts of sodium bicarbonate dissolved in methanol. The solution of the semicarbazone resulting was concentrated and cooled to precipitate the semicarbazone. The first crop of crystals obtained amounted to 8.3 parts by weight and a second crop amounted to 38% of the theoretical. The melting point of the crystalline semicarbazone was 217 to 219° C.

While the above example illustrates the reduction of the acid chloride of dehydroabietic acid by means of a catalyst comprising palladium on barium sulfate, other catalysts for carrying out the reduction may also be used such as other noble metal hydrogenation catalysts. The catalyst employed must be sufficiently active to facilitate the replacement of the halogen of the acid halide by hydrogen but not so active as to further reduce the aldehyde group formed. Palladium supported on an inert base such as barium sulfate is particularly desirable.

In carrying out the reduction with the palladium-barium sulfate catalyst, a solution of the acid halide such as the acid chloride or acid bromide of dehydroabietic acid in a suitable solvent such as benzene, toluene, xylene, or purified petroleum fractions, will be employed. The temperature for carrying out the reduction may be varied to provide suitable reaction but preferably will be within the range of about 80 to about 150° C. The time required for carrying out the reaction will be dependent on the particular catalyst used as well as on the particular temperature used.

The acid chloride of dehydroabietic acid useful in the production of dehydroabietinal in accordance with this invention may be obtained by treatment of dehydroabietic acid witht thionyl chloride or by any other suitable method. Similar methods may be used in preparing the acid bromide.

Dehydroabietinal is particularly useful as an intermediate for production of other compounds such as by condensation with phenols, amines, etc., by sulfonation, nitration, etc. It is also useful for the formation of addition products such as the semicarbazone.

What I claim and desire to protect by Letters Patent is:

1. As a new composition of matter, dehydroabietinal.

2. The method of producing dehydroabietinal which comprises reducing an acid halide of dehydroabietic acid.

3. The method of producing dehydroabietinal which comprises reducing the acid chloride of dehydroabietic acid.

4. The method of producing dehydroabietinal which comprises reducing the acid chloride of dehydroabietic acid with hydrogen in the presence of a catalyst.

5. The method of producing dehydroabietinal which comprises reducing the acid chloride of dehydroabietic acid with hydrogen in the presence of a noble metal catalyst.

6. The method of producing dehydroabietinal which comprises reducing the acid chloride of dehydroabietic acid with hydrogen in the presence of a catalyst comprising palladium supported on barium sulfate.

WILLIAM P. CAMPBELL.